(12) United States Patent
Von Elm et al.

(10) Patent No.: US 9,075,237 B2
(45) Date of Patent: Jul. 7, 2015

(54) BEAM-COMBINER FOR FIBER-DELIVERED LASER-BEAMS OF DIFFERENT WAVELENGTHS

(71) Applicant: Coherent, Inc., Santa Clara, CA (US)

(72) Inventors: Rüdiger Von Elm, Wielen (DE); Chantal Marois, Wilsonville, OR (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/266,385

(22) Filed: Apr. 30, 2014

(65) Prior Publication Data

US 2014/0340761 A1    Nov. 20, 2014

Related U.S. Application Data

(63) Continuation of application No. PCT/US2012/065367, filed on Nov. 15, 2012, which is a continuation of application No. 13/301,574, filed on Nov. 21, 2011, now Pat. No. 8,599,487.

(51) Int. Cl.
*G02B 27/12* (2006.01)
*G02B 6/34* (2006.01)
*G02B 27/10* (2006.01)
*G02B 6/293* (2006.01)

(52) U.S. Cl.
CPC .......... *G02B 27/126* (2013.01); *G02B 27/1006* (2013.01); *G02B 6/29373* (2013.01); *G02B 6/2938* (2013.01)

(58) Field of Classification Search
USPC .............. 359/631–640, 668, 669, 326, 328; 385/14, 32, 36
See application file for complete search history.

(56) References Cited

U.S. PATENT DOCUMENTS

| | | | |
|---|---|---|---|
| 3,743,383 A | 7/1973 | Giallorenzi | |
| 5,444,213 A * | 8/1995 | Honda et al. | ............. 219/121.76 |
| 5,930,600 A | 7/1999 | Seelert et al. | |
| 6,028,722 A | 2/2000 | Lang | |
| 6,449,066 B1 | 9/2002 | Arns et al. | |
| 6,477,293 B1 | 11/2002 | Golub | |
| 6,525,846 B1 | 2/2003 | Yan et al. | |
| 7,430,071 B2 | 9/2008 | Resan et al. | |
| 7,646,546 B1 | 1/2010 | O'Shaughnessy et al. | |
| 7,688,493 B2 | 3/2010 | Resan et al. | |

(Continued)

FOREIGN PATENT DOCUMENTS

| | | |
|---|---|---|
| EP | 1403632 A1 | 3/2004 |
| EP | 2151705 A1 | 2/2010 |

OTHER PUBLICATIONS

International Search Report and Written Opinion received for PCT Application No. PCT/US2012/065367, mailed on Feb. 13, 2013, 15 pages.

(Continued)

*Primary Examiner* — Mohammed Hasan
(74) *Attorney, Agent, or Firm* — Morrison & Foerster LLP

(57) ABSTRACT

A beam combiner for combining laser-beams of different colors along a common path includes a directing-prism for each of the laser-beams and one combining-prism. The directing-prisms are arranged to transmit the laser-beams to the combining-prism. The directing-prisms and the combining-prism are configured and arranged with respect to each other such that the directing-prism transmits the beams along the common path.

18 Claims, 6 Drawing Sheets

(56) References Cited

U.S. PATENT DOCUMENTS

| | | | |
|---|---|---|---|
| 8,432,943 B2* | 4/2013 | Ullman et al. | 372/6 |
| 8,669,543 B2* | 3/2014 | Yanagida et al. | 250/504 R |
| 2002/0154384 A1 | 10/2002 | Chen et al. | |
| 2005/0047724 A1 | 3/2005 | Farr | |
| 2009/0080085 A1 | 3/2009 | Botma | |
| 2009/0296242 A1 | 12/2009 | Callen et al. | |
| 2011/0249197 A1 | 10/2011 | Sprowl et al. | |

OTHER PUBLICATIONS

Non Final Office Action received for U.S. Appl. No. 13/301,574, mailed on Jun. 14, 2013, 13 pages.

Notice of Allowance received for U.S. Appl. No. 13/301,574, mailed on Aug. 12, 2013, 9 pages.

International Preliminary Report on Patentability received for PCT Patent Application No. PCT/US2012/065367, issued on May 27, 2014, 10 pages.

* cited by examiner

BEAM-COMBINER FOR FIBER-DELIVERED LASER-BEAMS OF DIFFERENT WAVELENGTHS

CROSS REFERENCED TO RELATED APPLICATIONS

This application is a continuation of PCT/US2012/065367, filed Nov. 15, 2012, which claims priority to U.S. patent application Ser. No. 13/301,574, filed Nov. 21, 2011, which issued as U.S. Pat. No. 8,599,487 on Dec. 3, 2013, each of which are hereby incorporated by reference in the present disclosure in their entirety.

TECHNICAL FIELD OF THE INVENTION

The present invention relates in general to spectral combination of laser-beams having different wavelengths. The invention relates in particular to combining into a single optical fiber, laser-radiation from a plurality of optical fibers with each of the fibers delivering radiation at a wavelength different from the wavelength of radiation delivered by any other fiber.

DISCUSSION OF BACKGROUND ART

Laser-beams of different wavelengths (colors) are commonly used in a broad range of life-science applications from scientific research leading to medical advances, to clinical functions where lasers are used in diagnostics. Life science applications include flow cytometry and cell sorting, multi-spectral microscopy, DNA sequencing and retina scanning. The laser-beams are predominantly used in these applications to excite fluorophores attached to a sample, allowing researchers and clinicians to perform a variety of important tests at both the cellular and molecular level.

A common method of transporting laser-radiation to an application site, microscope or apparatus is via an optical fiber. In applications such as multi-spectral microscopy or flow cytometry, which require radiation in a range of different wavelengths, laser-beams of these different wavelengths must be coupled into the optical fiber from sources providing the different-wavelength laser-beams.

Semiconductor laser modules delivering radiation at wavelengths in a range from the ultraviolet (UV) region to the near infrared (NIR) region of the electromagnetic spectrum are commercially available. In such modules, radiation from one or more diode-lasers is coupled into an optical fiber for delivery. If a plurality of such sources is relied on to produce a plurality of different-wavelength beams for a particular application, means must be provided for combining the different-wavelength beams into single beam, usually transported by a single optical fiber as noted above.

Prior-art means for combining beams of different wavelengths have involved using a dispersive element such as a prism or diffraction grating "in reverse", i.e., by delivering beams to the element with an angle therebetween which corresponds to the deviation angle of those wavelengths where a beam having a continuous spectrum including those different wavelengths is dispersed by the element. Where optical losses are of concern, a prism is usually preferred. This is because a prism configured to combine beams at the angle of minimum dispersion (incidence angles at entrance and exit faces of the prism about equal) can transmit plane-polarized radiation (p-polarized with respect to the prism faces) with reflection losses less than about 1% with negligible anamorphic distortion. By way of example, an isosceles prism of F2 glass with an apex angle of 60° (an equi-angle prism) has a minimum deviation angle of about 55°, which is close to the Brewster angle of 56°.

A problem with combining fiber-delivered beams is that fiber terminations such as GRIN lenses, ferrules or connectors determine a minimum spacing for adjacent delivery fibers. A prism at minimum dispersion provides a relatively low dispersion which means that the delivery fibers must be located a relatively long distance from the prism to deliver along the appropriate dispersion angle. In the case of the F2-glass prism exemplified above, visible-spectrum wavelengths from blue at 405 nanometers (nm) to red at 640 nm are included within an angle of about 3°.

A minimum convenient spacing for FC fiber-connectors on a beam combiner housing would be about 5 millimeters (mm) center to center. If it were desired to combine five wavelengths including the red and blue wavelengths, using five connectors, that would require to a spacing between the red and blue wavelength connectors of about 20 mm. This would require that the five connectors be spaced at about 40 centimeters (cm) from the prism. In order to fit such an arrangement in a convenient enclosure having a "footprint" less than say 10 cm by 10 cm, this would require "folding" the beam path between the connectors and the prism using as many as four fold mirrors. Each fold mirror would require a broadband high-efficiency reflective coating for p-polarized radiation which would add to the cost and complexity of the combiner. There is a need for an alternate approach to accommodating a single beam-combining-prism into a fiber connected multi-wavelength beam combiner of convenient dimensions.

SUMMARY OF THE INVENTION

The present invention is directed to optical apparatus for combining at least a first plurality of laser-beams, each thereof having a different wavelength. In one aspect, optical apparatus in accordance with the present invention comprises a first plurality of directing-prisms equal in number to the first plurality of laser-beams, and a combining-prism. Each of the plurality of directing-prisms is arranged to transmit a corresponding one of the first plurality of different-wavelength laser-beams and direct that laser-beam to the combining-prism. The first plurality of directing-prisms and the combining-prism are configured and arranged such that the first plurality of different-wavelength laser-beams is transmitted by the combining-prism and exits the combining-prism along a common path.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
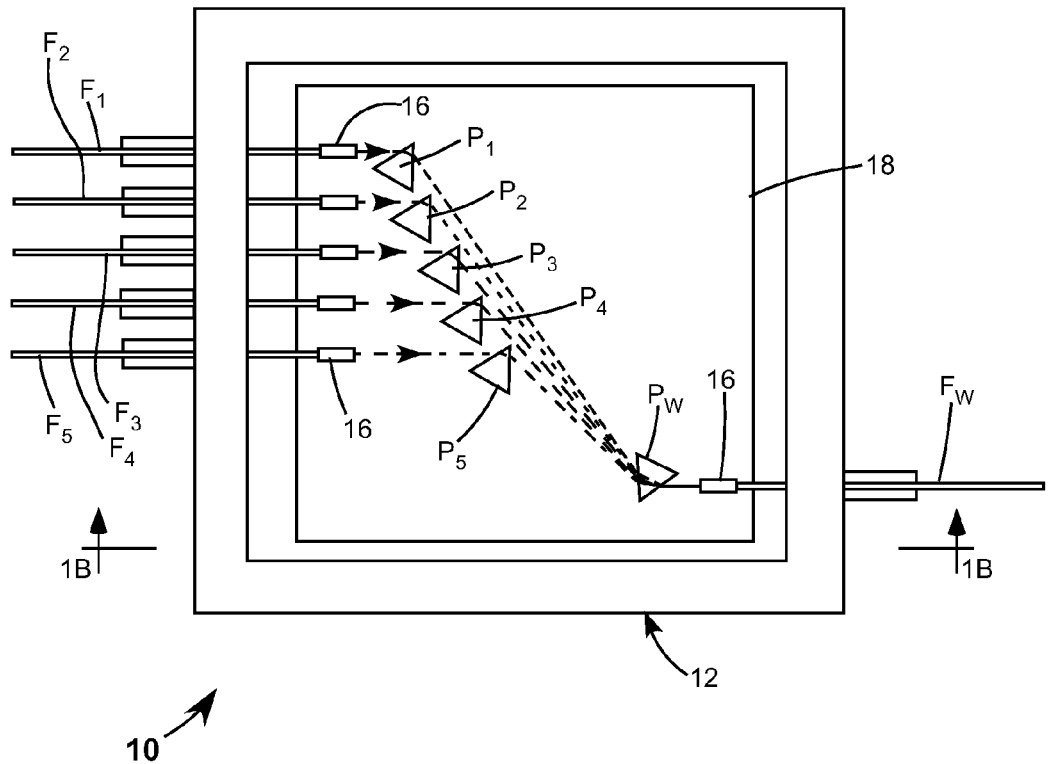
FIG. 1A is a plan view from above, schematically illustrating one preferred embodiment of a laser-beam combiner in accordance with the present invention for combining a plurality of laser-beams each having a different wavelength, a corresponding plurality of directing-prisms each thereof arranged transmit a corresponding one of the different-wavelength laser-beams and direct that laser-beam to a combining-prism, with the directing-prisms and the combining-prism configured and arranged such that the beams directed onto the combining-prism are transmitted by the combining beam, exit the combining-prism combined on a common path and are focused into an output optical fiber.
Figure 1B:
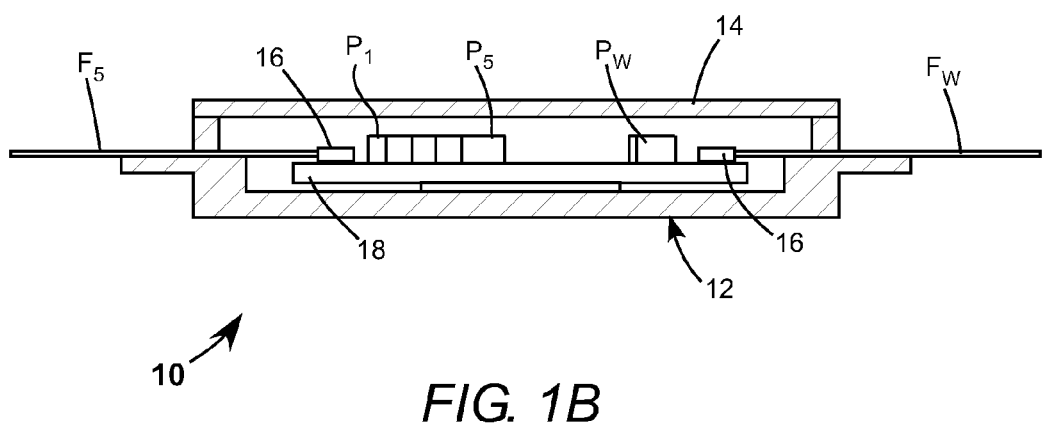
FIG. 1B is an elevation view, partly in cross-section, seen generally in the direction 1B-1B of FIG. 1A, schematically illustrating further detail of the laser-beam combiner of FIG. 1A.

Referring now to the drawings, wherein like components are designated by like reference numerals, FIG. 1A and FIG. 1B schematically illustrates a preferred embodiment 10 of a laser-beam combiner in accordance with the present invention. Combiner 10 includes a housing 12 having a cover 14 (not present in FIG. 1A).

Laser-beams to be combined are introduced into the housing via optical fibers (delivery fibers) $F_1$, $F_2$, $F_3$, $F_4$ and $F_5$, listed in consecutive numerical order of increasing wavelength of radiation transported thereby. The fibers are preferably single mode, polarization-maintaining fibers delivering the single-mode beams plane-polarized in the plane of the drawing.

By way of example, the fibers $F_1$ through $F_5$ may carry radiation having wavelengths 488 nanometers (nm), 515 nm, 532 nm, 561 nm, and 640 nm respectively. The input fibers are depicted in FIGS. 1A and 1B as extending through the housing for convenience of illustration in these schematic renderings. In practice the fibers would be connected to fiber connectors such as FC connectors spaced apart on the housing. Output fibers from laser modules having the appropriate output wavelengths would be transported by fibers and connected to the combiner via the connectors thereon. This is discussed further hereinbelow.

Each delivery fiber 16 is terminated by a collimating lens 16, for example, a gradient refractive index (GRIN) lens. Lenses 16 collimate the fiber-delivered beams and direct the beams parallel to each other such that each one is incident on a face of a corresponding one of prisms $P_1$, $P_2$, $P_3$, $P_4$ and $P_5$, which can be referred to as directing-prisms. The prisms are arranged spaced apart in a direction at an angle to the propagation direction of the fiber-delivered beams. The directing-prisms are also arranged such that the beams are incident thereon at about the minimum-deviation angle. The prisms are preferably all of equal dimensions, made from the same suitable glass, and with the bases of the prisms parallel to each other. One suitable glass is N-SF11 which has a high refractive index and relatively high dispersion. This provides that the prisms can be equal angle (60°) prisms with minimum-deviation beam-incidence thereon near the Brewster angle to minimize losses.

The different wavelength beams are turned by directing-prisms $P_1$-$P_5$ to form a beam dispersion fan (in the plane of the drawing only) which converges onto a combining-prism ($P_W$). Prism $P_W$ is preferably of the same dimensions and material as directing-prisms $P_1$-$P_5$ and is arranged with the combining apex thereof opposed to the apexes of the directing-prisms, but with the base thereof parallel to the bases of the directing-prisms. The distance between $P_5$ and $P_W$ is selected such that prism $P_W$ combines the different-wavelength beams along a common path forming in effect a collimated beam of white light which is focused by a GRIN lens 16 into a white-light output-fiber $F_W$.

It will be evident from the drawing of FIG. 1 that using individual prisms for directing individual beams being combined allows the prism apexes to intrude marginally into the beam fan at widely spaced points along the fan which provides for a wide separation of input fibers (input beams) without a long beam-path. The arrangement has other advantages in manufacturing, as all prisms have the same dimensions, are of the same material, and no optical coatings are required. The directing-prisms, the combining-prism and the grin lenses can all be bonded to a common base-plate 18, after being aligned. Alignment can be effected by a suitable cut-out mask or jig. One suitable method for solder bonding optical components is described in U.S. Pat. No. 5,930,600, assigned to the assignee of the present invention and the complete disclosure of which is hereby incorporated herein by reference.

Figure 2:
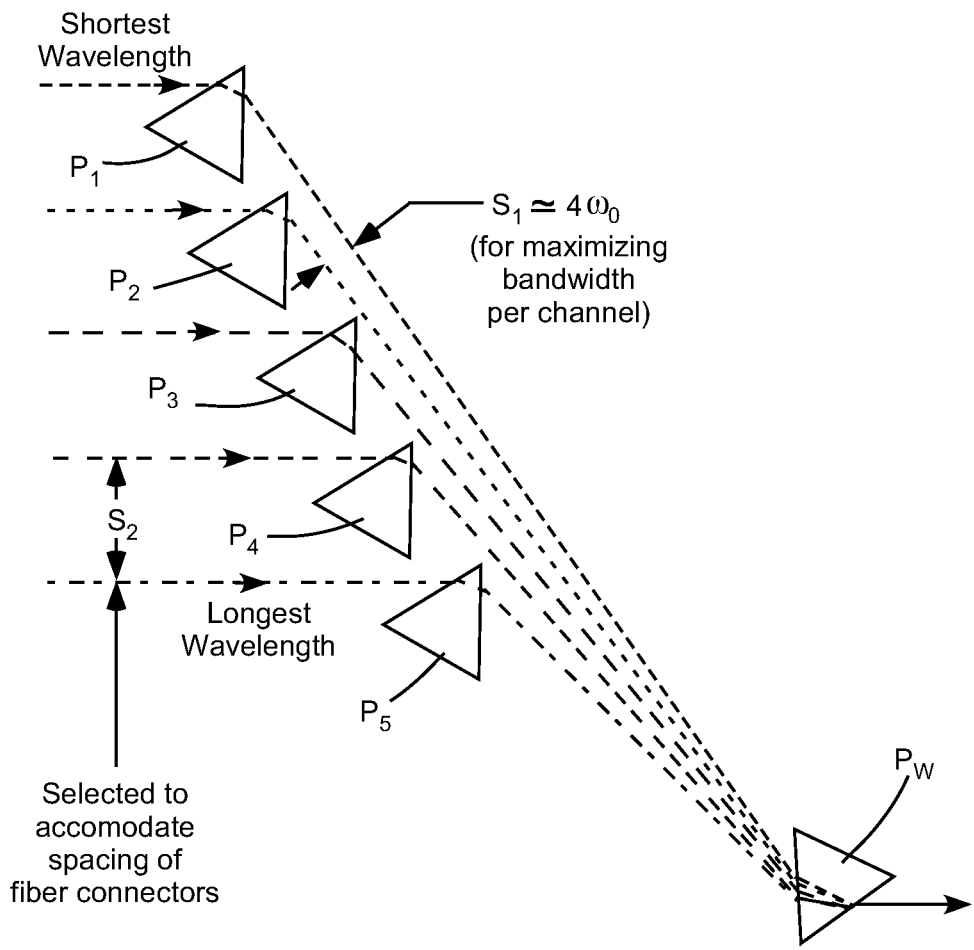
FIG. 2 schematically illustrates detail of the prism arrangement and exemplary spacing of beams and input fibers in the arrangement of FIGS. 1A and 1B.

It is advantageous to configure the inventive beam combiner to maximize the acceptance bandwidth of input channels, i.e., input fibers. This enables the combiner to accommodate anticipated variations in the wavelength of a diode-laser module from a nominal center wavelength. FIG. 2 schematically illustrates detail of the prism arrangements of FIG. 1A indicating a preferred beam spacing $S_1$ of approximately 4-times $\omega_0$, where $\omega_0$ is the beam radius. The spacing $S_2$ between input fibers is about 5.5 mm. From the description of the present invention provided herein one skilled in the art can design other prism and fiber spacing-combinations using commercially available optical design software, such as ZEMAX available from the Zemax Corporation, of Belleview, Wash.

Figure 2A:
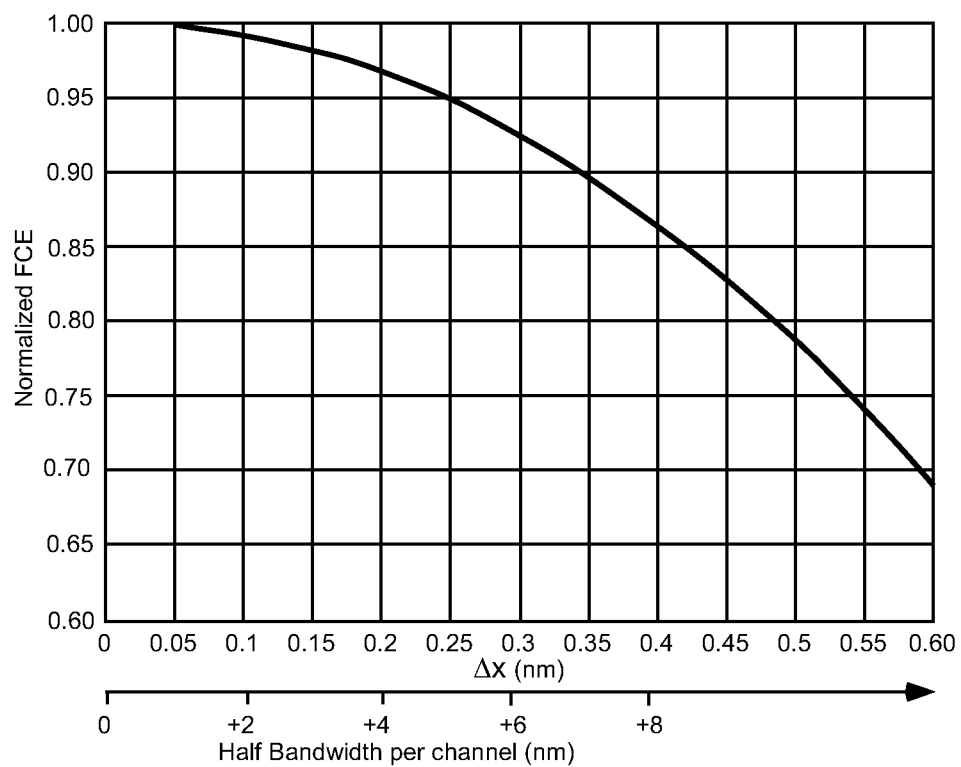
FIG. 2A is a graph schematically illustrating relative coupling efficiency at the output fiber of FIGS. 1A and 1B as a function of relative lateral shift of the combined beam with respect to the output fiber, with the relative shift related to a variation of a beam-wavelength from a nominal or design value for that beam.

It should be noted that the "bandwidth per channel" is related to a relative lateral beam-shift $\Delta x$ (in the plane of the drawing, relative to $\omega_0$) from perfect alignment at combining fiber $F_W$. This lateral shift is related to the deviation of the actual input wavelength from a nominal input wavelength, and translates to a reduction in fiber coupling efficiency (FCE) from a maximum practical value. The bandwidth per channel, accordingly, is determined by the extent of FCE reduction that is tolerable. This is illustrated in the graph of FIG. 2A, which schematically depicts FCE as a function of relative lateral shift and the corresponding half (the positive half) bandwidth per channel. In the calculation of FIG. 2A, it is assumed that the difference in nominal (center) wavelength of adjacent channels (beams) is 83 nm.

Figure 3:
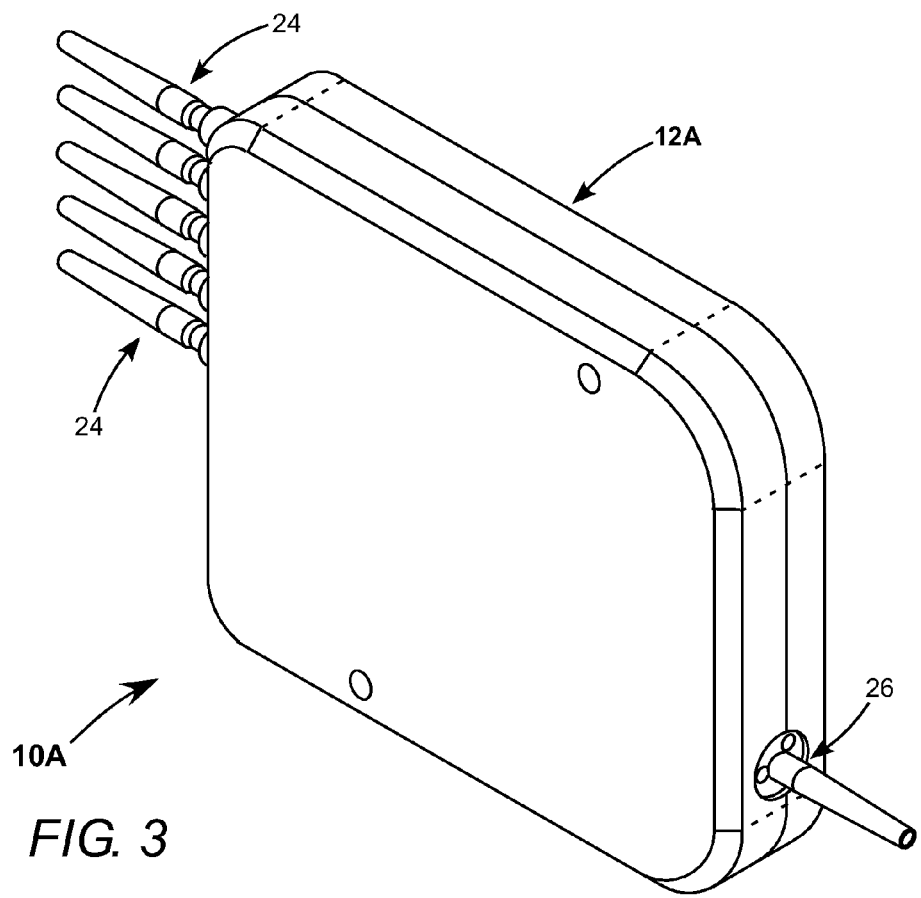
FIG. 3 is a three-dimensional view schematically illustrating a computer draftspersons design for a package including the arrangement of FIGS. 1A and 1B.
Figure 3A:
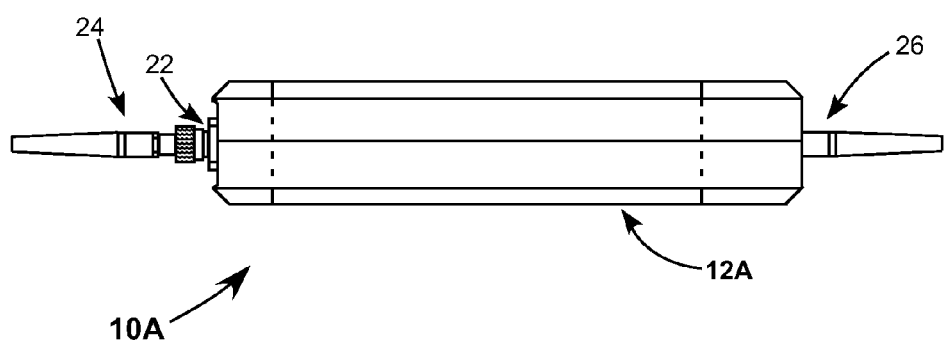
FIG. 3A is an elevation view schematically illustrating detail of fiber connectors in the package of FIG. 3.

FIG. 3 and FIG. 3A schematically illustrate a design 10A for a practical package including the arrangement of FIGS. 1A and 1B. Here, fibers $F_1$ through $F_5$ of FIG. 1A are all within the combiner-enclosure, which is designated with reference numeral 12A. The fibers are connected to the female members 22 of fiber connectors such as the above referenced FC connectors. Male members 24 of the connectors are attached to fibers (not shown) transporting radiation from laser modules providing the particular radiation wavelengths to be combined. In arrangement 10A, it is contemplated that output fiber $F_W$ is semi-permanently "pigtailed" to the package by a connector 26. The term "semi-permanently", as used here, recognizes that the output fiber could be manufacturer replaceable, if necessary. A package such as 10A can be made with dimensions a compact as about 5 cm per side with a thickness of about 1 cm. Dimensions of directing and combining prisms can be on the order of 5 mm per side.

Figure 4:
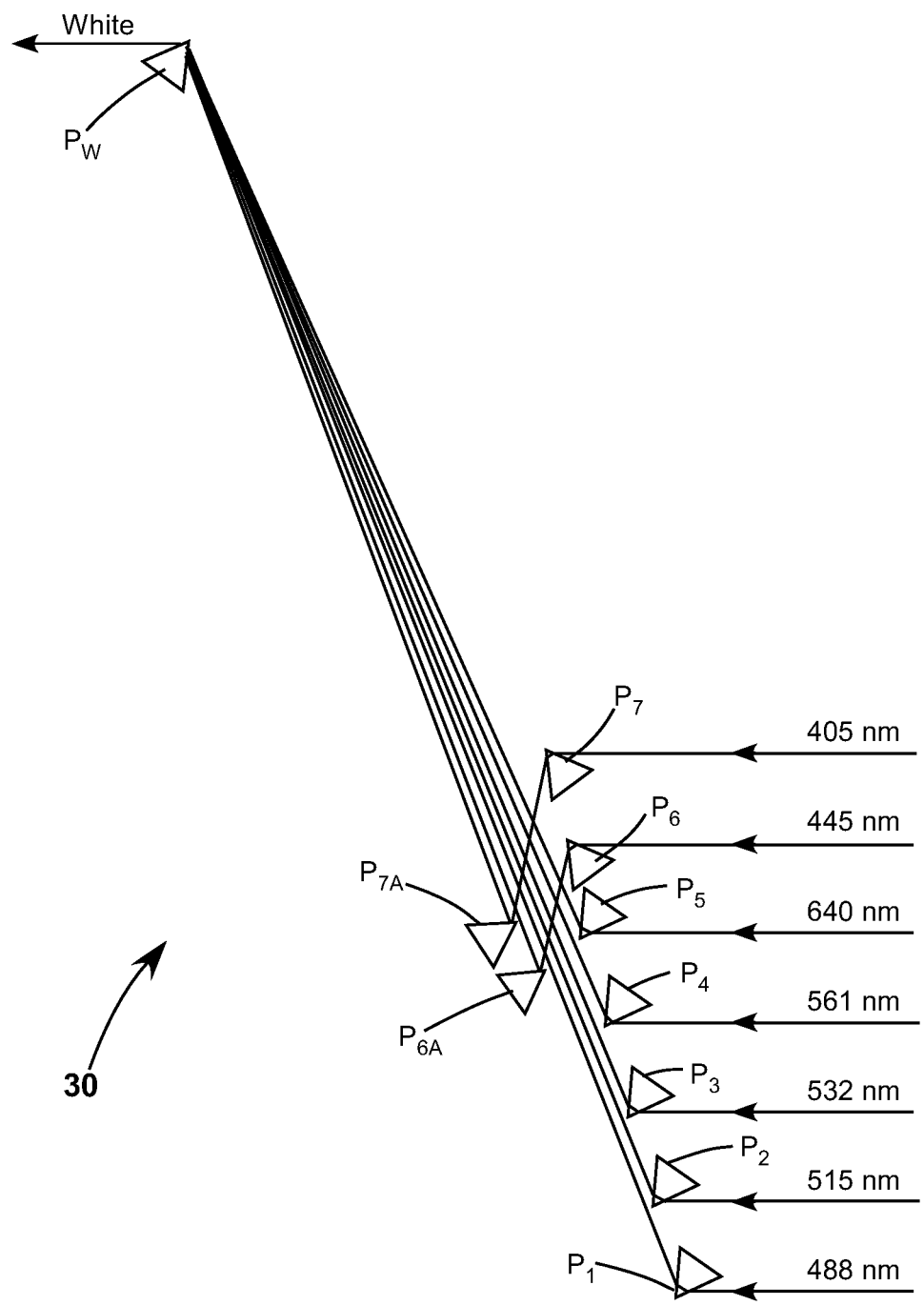
FIG. 4 schematically illustrates another preferred embodiment of a laser-beam combiner in accordance with the present invention similar to the embodiment of FIGS. 1A and 1B but having additional beams directed to the combining prism by a plurality of directing prism and turning mirror pairs.

FIG. 4 schematically illustrates another preferred embodiment 30 of a laser-beam combiner in accordance with the present invention. Combiner 30 is similar to combiner 10 of FIGS. 1A and 1B, but is modified to accommodate more beams to be combined, while still maintaining a relatively compact arrangement. In this example seven beams are combined, with the shortest-wavelength beam being a 405 nm-beam and the longest wavelength beam being the same (a 640 nm-beam) as exemplified above with reference to exemplary wavelengths of arrangement 10. This means that, absent any modification, the beam path would need to be correspondingly longer from the combining-prism ($P_W$) to the furthest-removed directing-prism to accommodate the additional shorter wavelength beams.

In arrangement 30, there is a first plurality of directing-prisms $P_1$ through $P_5$ all similarly oriented as in arrangement 10. In this example of arrangement 30, this plurality of directing-prisms directs beams having wavelengths 488 nm, 515 nm, 532 nm, 561 nm and 640 nm respectively, i.e., from the longest-wavelength beam to some intermediate shorter-wavelength beam. This intermediate shorter-wavelength beam determines the longest distance of a directing-prism from combining-prism $P_W$. The other two beams, here at the shortest (405 nm) wavelength and the next (at 445 nm) are directed by directing-prisms $P_7$ and $P_6$, respectively, closer to prism $P_W$ than is $P_5$, across the beam paths of the longer wavelength beams to prisms $P_{6A}$ and $P_{7A}$, faces of which are provided with reflecting coatings (not shown) to allow these faces to act as, and be defined as, as turning-mirrors. Prisms $P_{6A}$ and $P_{7A}$ are oriented such that these reflective faces thereof direct the 445 nm- and 405 nm-beams to prism $P_W$ at an angle appropriate for beam combination by prism $P_W$ along the common output path.

The orientation of directing-prisms $P_6$ and $P_7$ is significantly different from that of prisms $P_1$ through $P_5$. Further, while these depicted in an orientation such that input beams thereof are parallel, for convenience of packaging, different orientations are possible (with corresponding differences in orientation of the turning-mirror prisms), but the directing-prisms should still be used in the minimum-deviation mode, as depicted, for proper pairing with the combining-prism.

In theory at least, conventional (parallel-sided) mirrors could be substituted for prisms $P_{6A}$ and $P_{7A}$. However, conventional mirror could have problems in aspect-ratio (rigidity) and can also be more difficult to mount. The use of faces of the prisms as mirrors (using a prism as a mirror substrate) is preferred because the mirror substrate is rigid and can be manufactured in a same batch as directing-prisms. The side of the prisms is convenient for bond-mounting and alignment on a base-plate (such as base-plate 18 of FIGS. 1A and 1B) as preferred for the directing-prisms. Further, the apex of the prism allows beam turning to be accomplished with a close physical spacing of the beams to be combined. In practice, the apex of any of the prisms does not need to be a "knife-edge" as depicted, but can be slightly flattened, while still being describable as an "apex" for purposes of this description and the appended claims.

Figure 5:
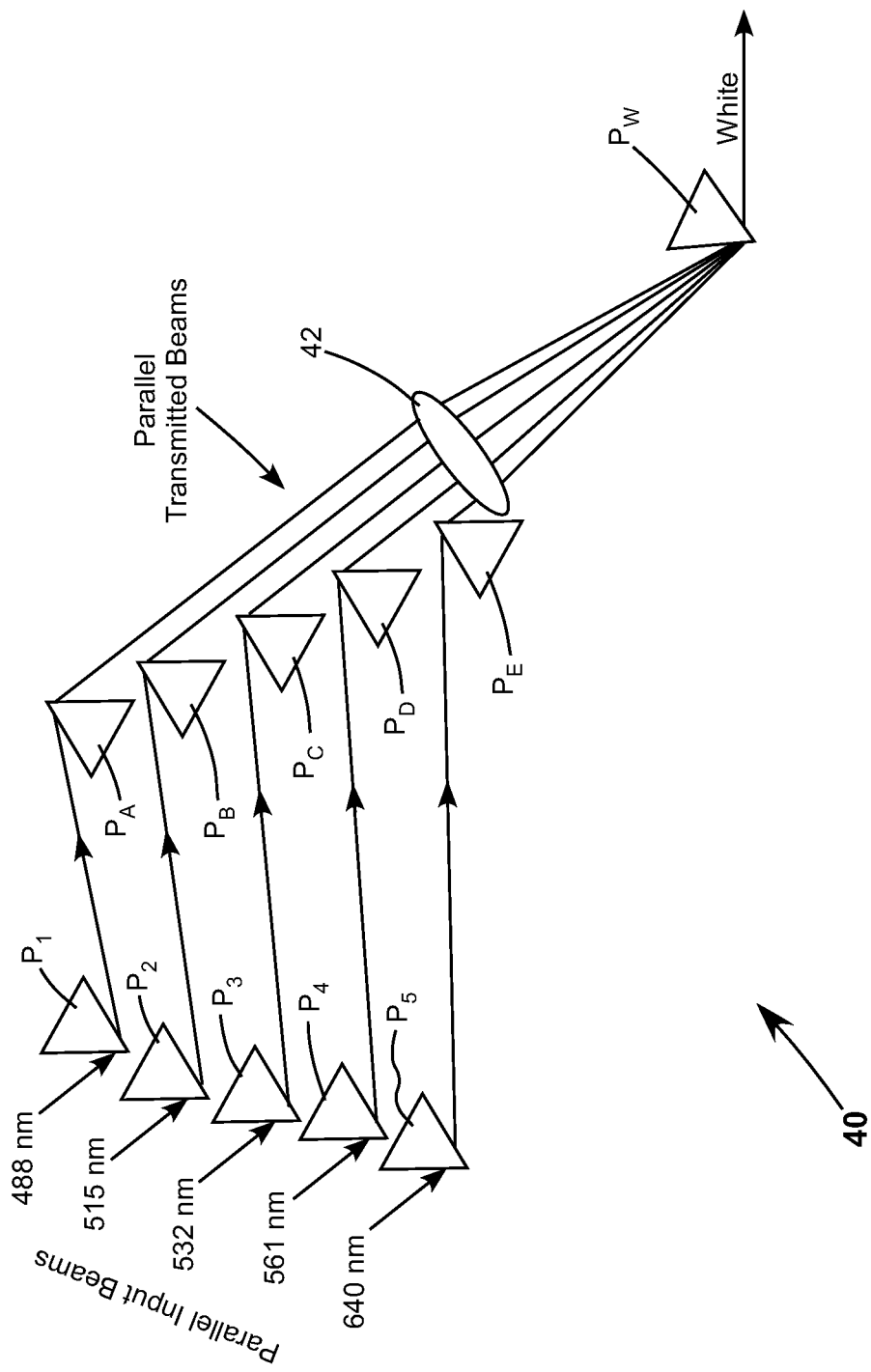
FIG. 5 schematically illustrates yet another preferred embodiment of a laser-beam combiner in accordance with the present invention for combining a plurality of parallel propagating input laser-beams having a first spacing therebetween, including a corresponding plurality of directing-prism pairs arranged to significantly reduce the spacing between the parallel input laser-beams to a second spacing, and a lens arranged to focus the second-spacing input laser-beams onto a combining-prism, with the focal length of the lens and the orientation and configuration of the combining-prism arranged such that the second-spacing input laser-beams are combined on a common path by the combining-prism.

FIG. 5 schematically illustrates yet another embodiment 40 of a laser-beam combiner in accordance with the present invention. Here, prisms $P_1$, $P_2$, $P_3$, $P_4$ and $P_5$ receive spaced-apart parallel beams having wavelengths of 488 nm, 515 nm, 532 nm, 561 nm, and 640 nm, respectively. Prisms $P_1$, $P_2$, $P_3$, $P_4$ and $P_5$ are paired with prisms $P_A$, $P_B$, $P_C$, $P_D$ and $P_E$, respectively. Beams having the respective wavelengths leave the prism pairs parallel to each other but much closer spaced than beams input to prisms $P_1$, $P_2$, $P_3$, $P_4$ and $P_5$. Preferably all of the prisms are made from the same glass, are of equal dimensions and are arranged in about the minimum deviation condition. The bases of prisms $P_1$, $P_2$, $P_3$, $P_4$ and $P_5$ are parallel to each other and parallel to the bases of prisms $P_A$, $P_B$, $P_C$, $P_D$ and $P_E$. The apexes of the $P_1$ through $P_5$ prisms are opposed to the apexes of the $P_A$ though $P_E$ prisms, thereby achieving the parallel input and output beam conditions for the prism pairs.

The closely spaced, parallel output-beams from the PA through PE prisms are focused by a lens 32 onto a combining-prism $P_W$. Prism $P_W$ is preferably made from the same glass as the other prisms, with the base of the combining-prism parallel to the bases of the other prisms. The spacing of the parallel beams incident on the lens and the focal length of the lens are selected such that prism $P_W$ combines the different wavelength beams along a common path as discussed above with reference to other preferred embodiments of the invention. Preferably the focal length of lens 42 is on the order of the spacing between prisms in the prism-pairs. The arrangement of FIG. 5, from the description thereof provided herein can also be modeled using commercially available optical design software as noted above.

In the embodiments of FIGS. 1A-B and FIG. 4 there is some dispersive action in the channels between the directing-prisms and the combining-prism $P_W$, which makes the combination of beams somewhat sensitive to angular alignment of the directing-prisms. This dispersive action is compensated by the prism-pair arrangement of embodiment 40. Lateral shift and associated loss of FCE of the white beam as a result of wavelength deviation from nominal in any channel is not compensated. No representation is made that any advantage offered by embodiment 40 over other above-described embodiments is worth the implicit additional component costs and additional assembly costs.

Those skilled in the art to which the present invention pertains will recognize that while above-described embodiments of the inventive beam-combiner are exemplified using beams of particular wavelengths, beams of other wavelengths may be combined using these embodiments without departing from the spirit and scope of the present invention. Further, while the present invention is described above in terms of particular embodiments, the invention is not limited to those embodiments but is defined by the claims appended hereto.

What is claimed is:

1. An apparatus comprising:
   an enclosure;
   a plurality of first openings located on a first side of the enclosure each providing passage of a beam of laser radiation between the inside and outside of the enclosure, each opening associated with a different wavelength of laser radiation;

a second opening located on the second side of the enclosure opposite the first side and providing passage of a beam of laser radiation between the inside and outside of the enclosure, said second opening associated with a combined beam of laser radiation having multiple wavelengths;

a plurality of first prisms mounted within the enclosure and aligned with the first openings; and a second prism mounted within the enclosure and aligned with the second opening, said first and second prisms being oriented and positioned to define optical pathways for the respective beams of laser radiation between each of the first prisms and the second prism, said beams passing through the prisms without internal reflection.

2. The apparatus of claim 1, wherein the beam paths between the first openings and the first prisms are parallel to each other and wherein the first prisms are arranged spaced apart with bases thereof about parallel to each other.

3. The apparatus of claim 2, wherein the base of the second prism is about parallel to the bases of the first prisms and the apex of the second prism is opposed to the apexes of the first prisms.

4. The apparatus of claim 1, wherein the first prisms and the second prism have the same dimensions and are made from the same material.

5. The apparatus of claim 1, further including a plurality of first optical fibers connected to the first openings for transmitting the associated laser beam.

6. The apparatus of claim 5, further including a plurality of lenses located between each of the first optical fibers and the associated first prism.

7. The apparatus of claim 6, further including a second optical fiber connected to the second opening for transmitting the associated laser beam.

8. The apparatus of claim 7, further including a lens located between the second optical fiber and the second prism.

9. An apparatus as recited in claim 1 further including a plurality of third openings located on the first side of the enclosure each providing passage of a beam of laser radiation between the inside and outside of the enclosure, each third opening associated with a different wavelength of laser radiation, a plurality of third prisms aligned with the third openings and a plurality of reflectors associated with the third prisms, said prisms and reflectors being oriented and positioned to define optical pathways extending between the third prism, an associated reflector and the second prism.

10. The apparatus of claim 9, wherein the beam paths between the first openings and the first prisms and the third openings and the third prisms are parallel to each other and wherein the first prisms are arranged spaced apart with bases thereof about parallel to each other.

11. The apparatus of claim 10, wherein the base of the second prism is about parallel to the bases of the first prisms and the apex of the second prism is opposed to the apexes of the first prisms.

12. An apparatus comprising:

an enclosure;

a first optical fiber mounted to and through one side of the enclosure;

at least three second optical fibers mounted to and through an opposite side of the enclosure, said second optical fibers extending in a substantially parallel orientation, each of said second optical fibers carrying a different wavelength radiation;

a first prism mounted within the enclosure adjacent the end of first optical fiber; and at least three second prisms, one for each second optical fiber and mounted within the enclosure adjacent the ends of the second optical fibers, said first and second prisms defining an optical path between the end of the first optical fiber and ends of the second optical fibers, with the laser radiation passing through the prisms without internal reflection.

13. The apparatus of claim 12, wherein the second prisms are arranged spaced apart with bases thereof about parallel to each other.

14. The apparatus of claim 13, wherein the base of the first prism is about parallel to the bases of the second prisms and the apex of the first prism is opposed to the apexes of the second prisms.

15. The apparatus of claim 12, wherein the first prism and the second prisms have the same dimensions and are made from the same material.

16. The apparatus of claim 12, further including a plurality of lenses located between each of the second optical fibers and the associated second prisms.

17. The apparatus of claim 16 further including a lens located between the first optical fiber and the first prism.

18. An apparatus as recited in claim 12 further including a plurality of third optical fibers mounted to and through said opposite side of the enclosure, each third optical fiber associated with a different wavelength of laser radiation, a plurality of third prisms aligned with the third optical fibers and a plurality of reflectors associated with the third prisms, said first and third prisms and reflectors defining an optical path between the end of the first optical fiber and the ends of the third optical fibers.

* * * * *